(12) United States Patent
Itsede et al.

(10) Patent No.: US 11,860,362 B2
(45) Date of Patent: Jan. 2, 2024

(54) HUD MIRROR HOLDER AND IMAGE POSITIONAL ACCURACY DESIGN

(71) Applicant: Panasonic Automotive Systems Company of America, Division of Panasonic Corporation of North America, Peachtree City, GA (US)

(72) Inventors: Fidelis Itsede, Acworth, GA (US); John Austin, Fayetteville, GA (US); Duane Lucero, Senioa, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 817 days.

(21) Appl. No.: 16/670,452

(22) Filed: Oct. 31, 2019

(65) Prior Publication Data
US 2020/0142191 A1 May 7, 2020

Related U.S. Application Data

(60) Provisional application No. 62/756,783, filed on Nov. 7, 2018.

(51) Int. Cl.
| | |
|---|---|
| *G02B 27/00* | (2006.01) |
| *G02B 7/182* | (2021.01) |
| *B60K 35/00* | (2006.01) |
| *B60R 11/02* | (2006.01) |
| *G02B 27/01* | (2006.01) |

(52) U.S. Cl.
CPC .......... *G02B 27/0149* (2013.01); *B60K 35/00* (2013.01); *B60R 11/0229* (2013.01); *G02B 7/1821* (2013.01); *B60K 2370/1529* (2019.05); *B60K 2370/92* (2019.05); *G02B 2027/0159* (2013.01)

(58) Field of Classification Search
CPC ... G02B 27/01–0189; G02B 2027/0105–0198; G02B 7/00–40; B60K 2370/00–98; B60R 11/0229
See application file for complete search history.

(56) References Cited

U.S. PATENT DOCUMENTS

| | | | | |
|---|---|---|---|---|
| 2010/0085543 | A1* | 4/2010 | Yoshimura | H04N 9/3191 353/98 |
| 2018/0373036 | A1* | 12/2018 | Kim | G02B 27/0149 |
| 2019/0302457 | A1* | 10/2019 | Kim | B60K 37/04 |

* cited by examiner

*Primary Examiner* — Bao-Luan Q Le
*Assistant Examiner* — Christopher A Lamb, II
(74) *Attorney, Agent, or Firm* — Laurence S. Roach, Esq.

(57) ABSTRACT

A head up display mirror holder arrangement for a motor vehicle includes a picture generation unit producing a light field. A mirror reflects the light field such that the light field is visible to the driver as a virtual image. A mirror holder has two opposite ends and an activation feature. The two opposite ends are aligned along a rotational axis of the mirror. The mirror holder retains the mirror. Each of two bushings is coupled to a respective opposite end of the mirror holder. A calibration switch has minimum proximity to the activation feature of the mirror holder.

14 Claims, 6 Drawing Sheets

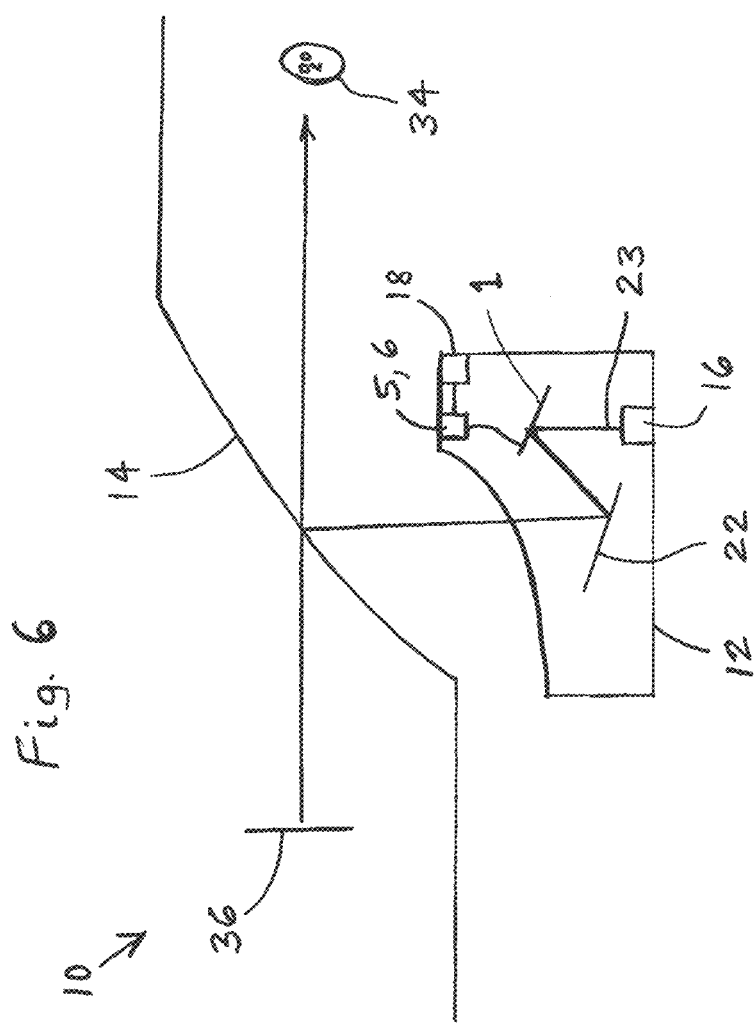

HUD MIRROR HOLDER AND IMAGE POSITIONAL ACCURACY DESIGN

CROSS-REFERENCED TO RELATED APPLICATIONS

This application claims benefit of U.S. Provisional Application No. 62/756,783 filed on Nov. 7, 2018, the disclosure of which is hereby incorporated by reference in its entirety for all purposes.

FIELD OF THE INVENTION

The disclosure relates to a head up display (HUD) system in a motor vehicle.

BACKGROUND OF THE INVENTION

A head up display emits light that reflects off of one or more mirrors and from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

An arm or a lever may be connected between the mirror holder and the switch. This results in the activation face being removed from the rotational axis of the mirror, and increases the proximity to the limit switch. This also results in increased tolerance stack up, which in turn diminishes image accuracy. This known method also complicates the manufacturability of the mirror holder.

SUMMARY

The present invention may provide a mirror holder which accurately tunes the rotation of the mirror with high precision for optical systems such as Heads-Up-Displays (HUD). In order to accurately tune the rotation of the mirror, actuation and pivot features are provided in a self-centering shaft. The self-centering shaft may be located through the rotational axis of the mirror, and may be located precisely with absolute minimum distance to the mirror position calibration switch.

In one embodiment, the invention comprises a head up display mirror holder arrangement for a motor vehicle, including a picture generation unit producing a light field. A mirror reflects the light field such that the light field is visible to the driver as a virtual image. A mirror holder has two opposite ends and an activation feature. The two opposite ends are aligned along a rotational axis of the mirror. The mirror holder retains the mirror. Each of two bushings is coupled to a respective opposite end of the mirror holder. A calibration switch has minimum proximity to the activation feature of the mirror holder.

In another embodiment, the invention comprises a head up display mirror holding method for a motor vehicle, including producing a light field. The light field is reflected such that the light field is visible to the driver as a virtual image. The mirror is retained by use of a mirror holder having two opposite ends. The two opposite ends are aligned along a rotational axis of the mirror. A switch is activated when the mirror holder is at a predetermined position. In response to the activation of the switch, a feedback signal is transmitted to calibrate and record the predetermined position in a memory device.

In yet another embodiment, the invention comprises a head up display mirror holder arrangement for a motor vehicle, including a picture generation unit producing a light field. A mirror reflects the light field such that the light field is visible to the driver as a virtual image. A mirror holder has two opposite ends aligned along a rotational axis of the mirror. The mirror holder retains the mirror. Each of a first bushing and a second bushing is coupled to a respective opposite end of the mirror holder. A bracket couples the first bushing to a housing. The bracket includes a mechanical stop limiting rotation of the mirror relative to the bracket.

An advantage of the present invention is that it may improve mirror position accuracy due to the elimination of an extended arm for switch actuation. The invention may make it possible to locate the image of the HUD with an accuracy that exceeds standard specifications. The activation interface of limiting switches may be brought in very close proximity to the activating face of the mirror, and to the rotational axis of the mirror, which facilitates reduced tolerances and increased image positional accuracy.

Another advantage of the present invention is that the cylindrical shape of the mirror holder (which houses the activation face features) is easy to manufacture. No secondary parts need to be attached to the holder. Also, the tolerances of the shaft are easy to maintain in the tool. Thus, the invention may provide better manufacturability as all the activation features are encompassed in the cylindrical face of the mirror holder. No special slides and lifters are needed in the tool to implement an arm or lever.

Yet another advantage of the invention is that, due to the robustness of the cylindrical shape of the mirror holder's activation feature, there's no breaking-off, or brittle risk as seen on conventional extended activation arm/lever designs. Thus, the invention may provide a reduced scrap rate of the mirror holder due to the elimination of the extended arm/lever. Arm/lever designs are susceptible to breaking off during handling and/or assembly.

A further advantage of the invention is that the conical self-centering feature coupled with a compression spring and the use of high lubricity polymer (POM) increases durability without the need of adding secondary lubricants or grease into the gearing system. This also simplifies the system's tolerance stack-up.

BRIEF DESCRIPTION OF THE DRAWINGS

A better understanding of the present invention will be had upon reference to the following description in conjunction with the accompanying drawings.

FIG. 6 is a schematic side view of one embodiment of an automotive head up display arrangement of the present invention.

DETAILED DESCRIPTION OF THE PREFERRED EMBODIMENTS

Figure 1:
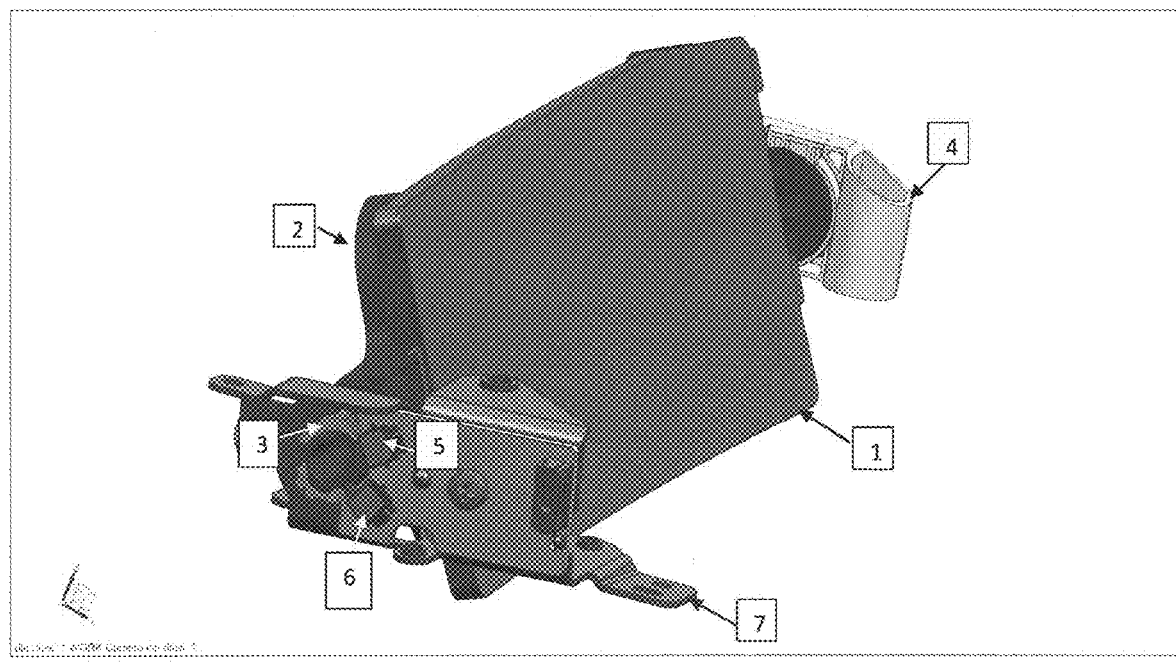
FIG. 1 is a perspective view of one embodiment of a HUD mirror assembly of the present invention.

FIG. 1 illustrates one embodiment of a HUD mirror assembly of the present invention, including a mirror 1 that is mated to a mirror holder 2. Mirror holder 2 is then located, by self-centering features, through a left bushing 3 and a right bushing 4 using the true rotational axis of the mirror's optical plane. Switches 5 and 6 play a very important role in the position of the HUD's image as they are used to calibrate the image position of the HUD, and also serve as feedback for memory storage for mirror 1. Switch 5 is the main calibration switch, and is the part with minimum proximity to the activation feature of mirror holder 2. A bracket 7 is the structure that mounts the HUD mirror assembly rigidly onto the HUD's housing. As mirror 1 and mirror holder 2 rotate, switches 5 and 6 are activated when the required threshold hold or position is achieved. The activated switch then sends a feedback signal to calibrate and record the position of mirror 1 (which is the position of the end image) into memory.

In one embodiment, mirror 1 is made out of injection molded plated COC polyplastic; holder 2 is made from injection molded re-enforced ABS resin; bushings 3 and 4 are made of injection molded POM; switches 5 and 6 are placed on a printed circuit board (PCB) assembly; and bracket 7 is made out of stamped steel. Bushings 3 and 4 are made out of POM which is a material of high lubricity, and which facilitates a smooth and frictional contact at the interface of the parts during rotation.

Figure 2:
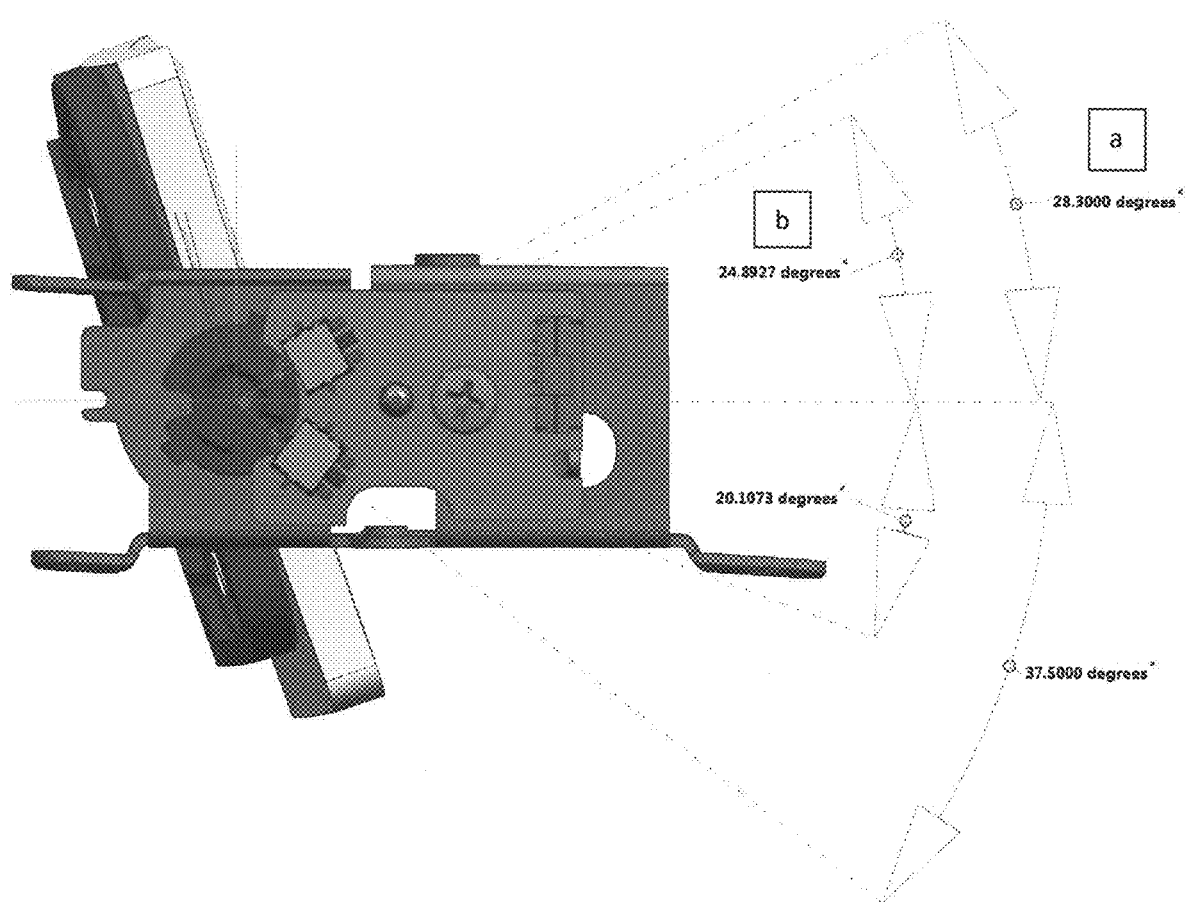
FIG. 2 is a side view of the HUD mirror assembly of FIG. 1.

FIG. 2 is a side view showing the activation angles determined by actuation surface of holder 2, and switches 5 and 6. These angles are measured from the rotational axis' horizontal plane. FIG. 2 shows the application and interface of all the parts with respect to position accuracy, and also feedback to the HUD for calibration, image location precision and mirror driver circuit protection. From the rotational axis of the mirror, holder 2 has a rotational angle a of 28.3°, and switch 5 (i.e., the main calibration switch) has an angle b of 24.8927°. This yields an activation angle of a−b=3.407°. The angle corresponding to angle a for switch 6 is 37.5°.

Figure 3:
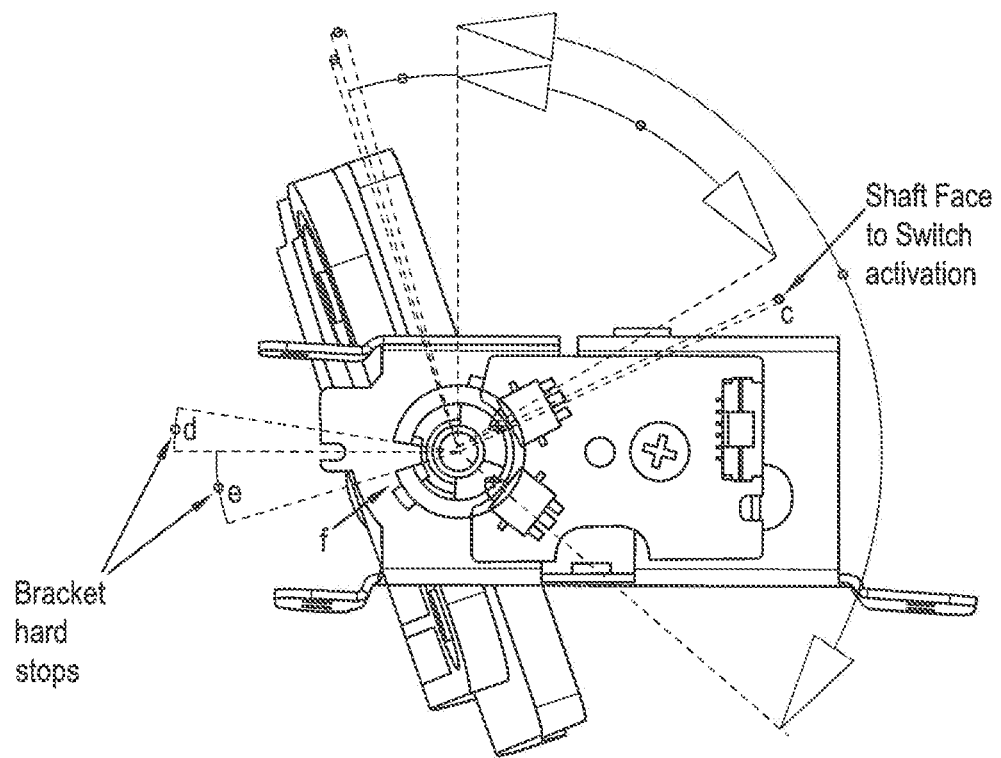
FIG. 3 is another side view of the HUD mirror assembly of FIG. 1.

FIG. 3 is a side view showing the travel distance proximity of the activation face of mirror holder 2 to the activation face of switch 5. FIG. 3 shows the translational distance between the activation face of mirror holder 2 and the activation face of calibration switch 5. This distance of 0.5568 mm from shaft face to switch activation illustrates the high precision that can be achieved in the activation of the switch as mirror holder 2 is about half a millimeter away from the activation face of switch 5. Thus, tolerance build up is reduced, and precise image location is achieved.

Holder 2 is located with precise angles d and e (8.8 degrees and 17.5 degrees, respectively) to the tab feature f of bracket 7 to provide bracket hard stops. This combination mechanically stops the rotation of mirror 1 in a scenario where a malfunction lets mirror 1 travel outside the design intent window. Implementing this protects the gearing system of the mirror from wearing out or binding. This mechanical stop also protects the motor from burning up due to the malfunction.

Figure 4A:
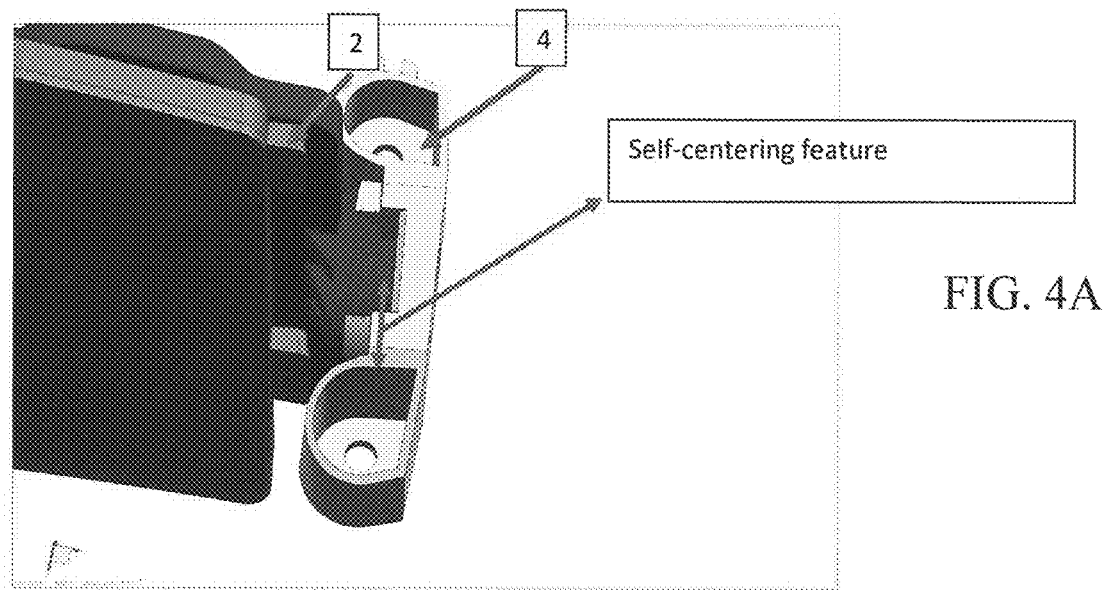
FIG. 4a is a top view of the self-centering feature of the mirror holder of the HUD mirror assembly of FIG. 1.
Figure 4B:
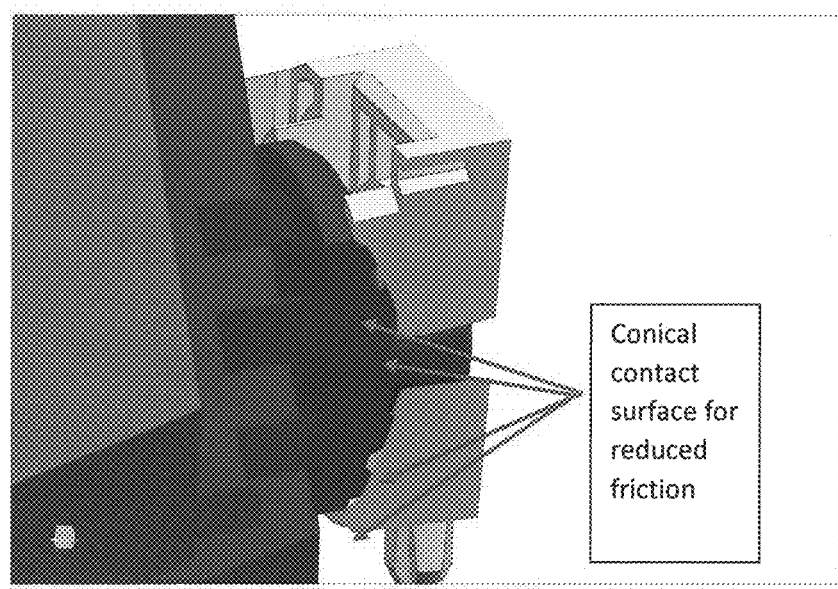
FIG. 4b is a cross-sectional view of the self-centering feature of the right bushing of the HUD mirror assembly of FIG. 1.

FIG. 4a illustrates the self-centering feature of mirror holder 2 to bushing 4. FIG. 4b illustrates the conical contact surface for reduced friction between mirror holder 2 and bushing 4. Instead of a conical contact surface between mirror holder 2 and bushing 4, there may be a frusto-conical contact surface, a semi-spherical contact surface, or a parabolic contact surface, for example.

Figure 5:
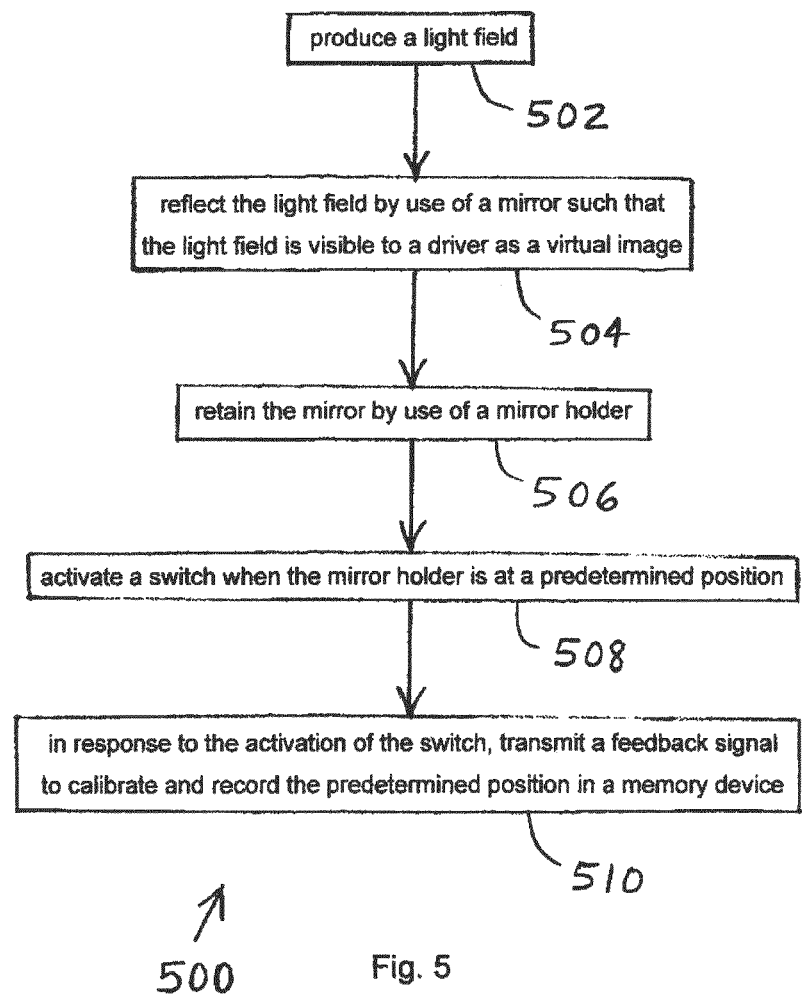
FIG. 5 is a flow chart of one embodiment of a head up display mirror holding method of the present invention for a motor vehicle.

FIG. 5 illustrates one embodiment of a head up display mirror holding method 500 of the present invention for a motor vehicle. In a first step 502, a light field is produced. For example, as described below, LCD 16 (FIG. 6) may produce light 23.

Next, in step 504, the light field is reflected such that the light field is visible to the driver as a virtual image. For example, light 23 from LCD 16 may be reflected by mirrors 20, 22 and windshield 14 toward a user 34. Light 23 may appear to user 34 as a virtual image 36.

In a next step 506, the mirror is retained by use of a mirror holder. For example, mirror 1 may be mated to a mirror holder 2.

In step 508, a switch is activated when the mirror holder is at a predetermined position. For example, as mirror 1 and mirror holder 2 rotate, switches 5 and 6 may be activated when the required threshold hold or position is achieved.

In a final step 510, in response to the activation of the switch, a feedback signal is transmitted to calibrate and record the predetermined position in a memory device. For example, the activated switch 5, 6 may send a feedback signal to calibrate and record the position of mirror 1 (which is the position of the end image) into memory device 18.

FIG. 6 illustrates one embodiment of an automotive head up display arrangement 10 of the present invention, including a HUD module 12 and a windshield 14. HUD module 12 includes a FIG. 3 in the form of LCD 16, a first mirror 1, a second mirror 22, switches 5, 6, and a memory device 18.

During use, light 23 from LCD 16 may be reflected by mirrors 1, 22 and windshield 14 toward a user 34. Light 23 may appear to user 34 as a virtual image 36. As mirror 1 rotates, switches 5 and 6 are activated when the required threshold hold or position is achieved. The activated switch 5, 6 then sends a feedback signal to calibrate and record the position of mirror 1 (which is the position of the end image) into memory device 18.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display mirror holder arrangement for a motor vehicle, the arrangement comprising:
 a calibration switch;
 a picture generation unit configured to produce a light field;
 a mirror configured to reflect the light field such that the light field is visible to the driver as a virtual image;

a rotatable mirror holder having two opposite ends and an activation feature, the two opposite ends being aligned along a rotational axis of the mirror, the mirror holder being configured to retain the mirror, the activation feature being configured to actuate the calibration switch by rotation of the mirror holder, the activation feature of the mirror holder having a cylindrical shape centered along the rotational axis of the mirror, wherein, while the light field is visible to the driver as a virtual image, the calibration switch has a maximum distance from the activation feature of the mirror holder, the maximum distance being less than one millimeter.

2. A head up display mirror holder arrangement for a motor vehicle, the arrangement comprising:
   a calibration switch;
   a picture generation unit configured to produce a light field;
   a mirror configured to reflect the light field such that the light field is visible to the driver as a virtual image;
   a rotatable mirror holder having two opposite ends and an activation feature, the two opposite ends being aligned along a rotational axis of the mirror, the mirror holder being configured to retain the mirror, the activation feature being configured to actuate the calibration switch by rotation of the mirror holder, the activation feature of the mirror holder having a cylindrical shape centered along the rotational axis of the mirror, wherein,
   while the light field is visible to the driver as a virtual image, the calibration switch has a maximum distance from the activation feature of the mirror holder, the maximum distance being less than one millimeter, and
   wherein the calibration switch and the activation feature of the mirror holder are separated by an angle of less than five degrees when the calibration switch is at the maximum distance from the activation feature of the mirror holder.

3. A head up display mirror holder arrangement for a motor vehicle, the arrangement comprising:
   a picture generation unit configured to produce a light field;
   a mirror configured to reflect the light field such that the light field is visible to the driver as a virtual image;
   a mirror holder having an activation feature and two opposite ends, the two opposite ends being aligned along a rotational axis of the mirror, the mirror holder being configured to retain the mirror;
   a first bushing and a second bushing, each said bushing being coupled to a respective said opposite end of the mirror holder;
   a bracket configured to couple the first bushing to a housing, the bracket including a mechanical stop configured to limit rotation of the mirror relative to the bracket; and
   a calibration switch, wherein the activation feature of the mirror holder is configured to actuate the calibration switch by rotation of the mirror holder, wherein, while the light field is visible to the driver as a virtual image, the calibration switch has a maximum distance from the activation feature, the maximum distance being less than 0.8 millimeter.

4. The head up display mirror holder arrangement of claim 3 wherein the calibration switch and the activation feature of the mirror holder are separated by an angle of less than 3.5 degrees when the calibration switch is at the maximum distance from the activation feature of the mirror holder.

5. The head up display mirror holder arrangement of claim 3 wherein the activation feature of the mirror holder has a cylindrical shape centered along the rotational axis of the mirror.

6. The head up display mirror holder arrangement of claim 3 further comprising a self-centering feature between the mirror holder and the second bushing.

7. The head up display mirror holder arrangement of claim 3 wherein each of the mirror holder and the second bushing has a respective conical contact surface, the conical contact surfaces interfacing with each other.

8. A head up display mirror holding method for a motor vehicle, said method comprising:
   producing a light field;
   reflecting the light field such that the light field is visible to the driver as a virtual image;
   retaining the mirror by use of a mirror holder;
   rotating the mirror holder to a position where an activation feature of the mirror holder is at a maximum distance from a switch, the activation feature and the switch always being separated by a distance that is less than or equal to the maximum distance while the light field is visible to the driver as a virtual image, the maximum distance being less than one millimeter;
   rotating the mirror holder to reduce the distance between the activation feature and the switch until the activation feature actuates the switch; and
   in response to the actuation of the switch, transmitting a feedback signal to calibrate and record the rotational position of the mirror holder in a memory device.

9. The head up display mirror holding method of claim 8 wherein the maximum distance is less than 0.6 millimeter.

10. The head up display mirror holding method of claim 8 further comprising:
    coupling a bushing to the mirror holder; and
    providing a self-centering feature between the mirror holder and the bushing.

11. The head up display mirror holding method of claim 10 wherein each of the mirror holder and the bushing has a respective conical contact surface, the conical contact surfaces interfacing with each other.

12. The head up display mirror holding method of claim 8 wherein the switch and the activation feature of the mirror holder are separated by an angle of less than four degrees when the switch is at the maximum distance from the activation feature of the mirror holder.

13. The head up display mirror holding method of claim 8 wherein the activation feature of the mirror holder has a cylindrical shape centered along a rotational axis of the mirror.

14. The head up display mirror holding method of claim 8 further comprising:
    coupling a bushing to the mirror holder; and
    coupling the bushings to a housing by use of a bracket, the bracket including a mechanical stop that limits rotation of the mirror relative to the bracket.

* * * * *